(12) United States Patent
Watazawa

(10) Patent No.: US 11,368,630 B2
(45) Date of Patent: Jun. 21, 2022

(54) IMAGE PROCESSING APPARATUS AND IMAGE PROCESSING METHOD

(71) Applicant: CANON KABUSHIKI KAISHA, Tokyo (JP)

(72) Inventor: Naoko Watazawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/103,989

(22) Filed: Nov. 25, 2020

(65) Prior Publication Data

US 2021/0168274 A1    Jun. 3, 2021

(30) Foreign Application Priority Data

Dec. 3, 2019 (JP) .............................. JP2019-219075

(51) Int. Cl.
*H04N 5/235* (2006.01)
*G06T 7/586* (2017.01)
*H04N 5/262* (2006.01)
*H04N 5/265* (2006.01)

(52) U.S. Cl.
CPC .......... *H04N 5/2354* (2013.01); *G06T 7/586* (2017.01); *H04N 5/2351* (2013.01); *H04N 5/265* (2013.01); *H04N 5/2621* (2013.01)

(58) Field of Classification Search
CPC .... H04N 5/2354; H04N 5/265; H04N 5/2621; H04N 5/2351; G06T 7/586
See application file for complete search history.

(56) References Cited

U.S. PATENT DOCUMENTS

| 2010/0020341 | A1 | 1/2010 | Enjuji |
| 2011/0026051 | A1 | 2/2011 | Wang |
| 2011/0262039 | A1 | 10/2011 | Du |
| 2016/0127630 | A1* | 5/2016 | Kitajima ............. H04N 5/2351 348/370 |
| 2017/0186222 | A1* | 6/2017 | Hata ................... H04N 5/2621 |
| 2019/0260921 | A1 | 8/2019 | Watazawa |

FOREIGN PATENT DOCUMENTS

JP          2016-072694 A      5/2016

OTHER PUBLICATIONS

Apr. 30, 2021 European Search Report in European Patent Appln. No. 20208560.1.

* cited by examiner

*Primary Examiner* — Ahmed A Berhan
(74) *Attorney, Agent, or Firm* — Venable LLP

(57) ABSTRACT

An image processing apparatus comprises a detection unit configured to detect region information of an object in an image, an acquisition unit configured to detect a predetermined object region that is a part of the object from the region information of the object, and to acquire luminance information of a periphery of the predetermined object region, and a relighting unit configured to perform processing for correcting brightness of the object in the image by adding an effect of virtual light. The relighting unit corrects the brightness of the object including the predetermined object region in accordance with luminance of the periphery of the predetermined object region.

10 Claims, 11 Drawing Sheets

FIG. 7A
BEFORE RELIGHTING PROCESSING
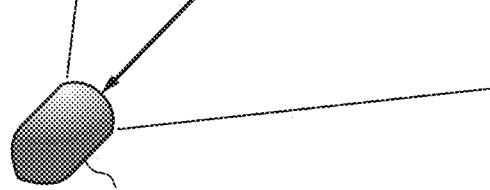
VIRTUAL LIGHT SOURCE
FIG. 7B
AFTER RELIGHTING PROCESSING
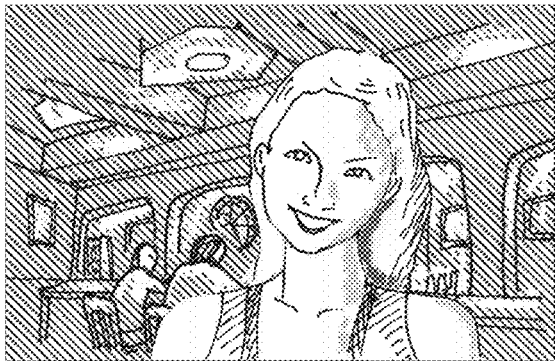

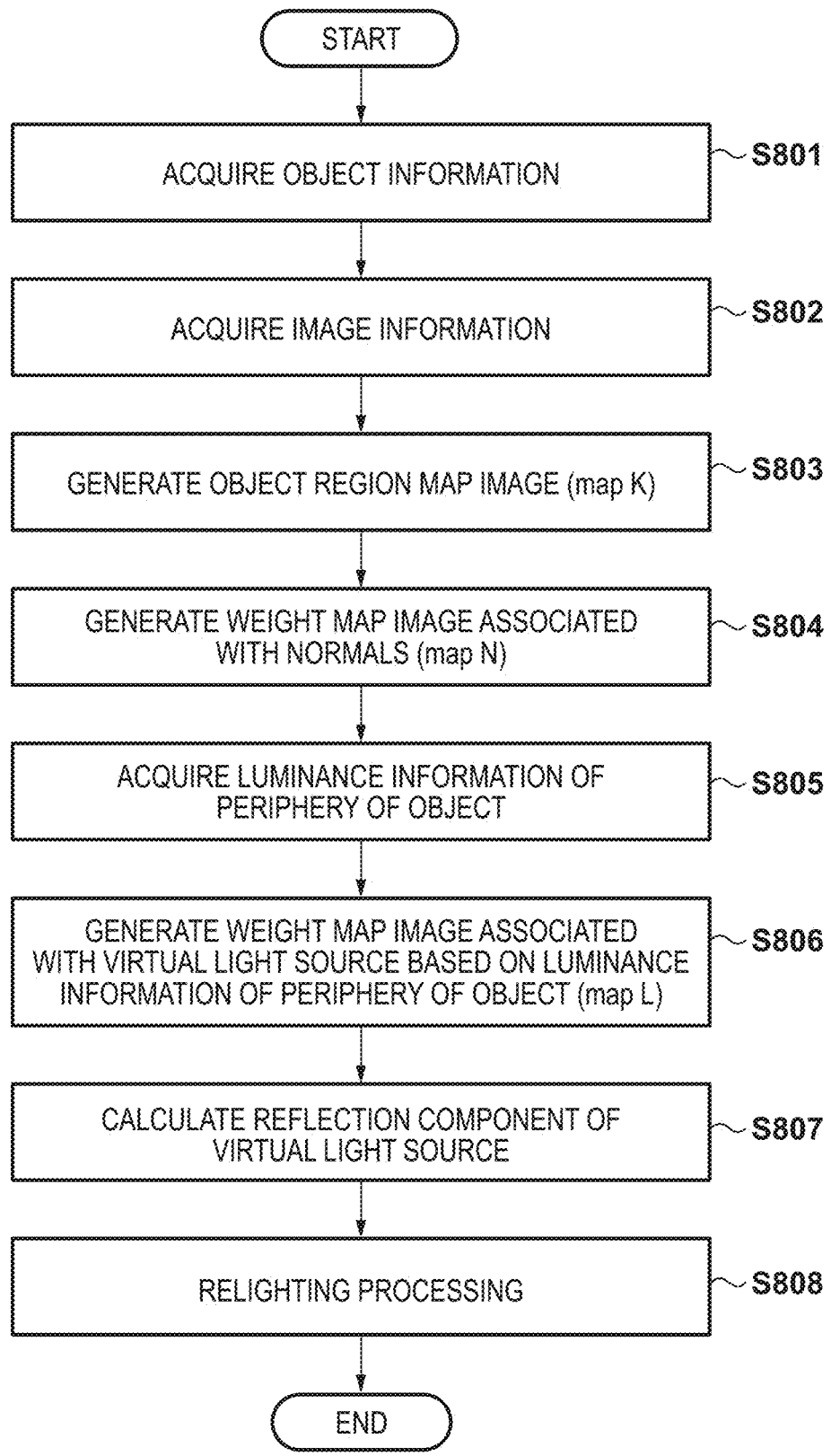

IMAGE PROCESSING APPARATUS AND IMAGE PROCESSING METHOD

BACKGROUND OF THE INVENTION

Field of the Invention

The present invention relates to an image processing technique that corrects the brightness of an object in an image.

Description of the Related Art

There is a conventionally known technique to perform relighting (reillumination) processing for correcting shadows by irradiating an object in a captured image with light from a virtual light source. The relighting processing makes it possible to obtain an image in which shadows and the like of an object that were produced by an ambient light source have been brightened.

Also, as a method of detecting an object region in an image, there is a method that uses information of a distance to an object. Furthermore, as a method of acquiring distance information, there is a stereo method that acquires images from a plurality of viewpoint positions and calculates a distance based on the principle of triangulation using parallax that is calculated from a correspondence relationship among pixels in respective images. There are also a DFD (Depth From Defocus) method, a DFF (Depth From Focus) method, and the like that calculate a distance by analyzing the blur states of a plurality of images that have been acquired under different image capture conditions, such as focal positions and diaphragms. With the use of distance information of an object, the amount (intensity) of light irradiated from a virtual light source can be controlled in accordance with a distance from the virtual light source to the object.

Japanese Patent Laid-Open No. 2016-72694 describes relighting processing in which the states of shadows in a predetermined region of an object in a captured image are detected, the characteristics of a virtual light source are determined from the detected states of shadows, and the captured image is corrected so as to achieve the states of shadows under light irradiated by a virtual light source that has the determined characteristics.

According to Japanese Patent Laid-Open No. 2016-72694, although the relighting processing is performed using distance information, the accuracy of the distance information is low under image capture conditions and image capture scenes in which the acquisition of the distance information is difficult. In this case, an image after the relighting processing may be unnatural; for example, a region that has been brightened by the relighting processing may extend outside of an object region targeted for the processing.

SUMMARY OF THE INVENTION

The present invention has been made in consideration of the aforementioned problems, and realizes techniques to reduce the unnaturalness of an image after relighting processing.

In order to solve the aforementioned problems, the present invention provides an image processing apparatus comprising: a detection unit configured to detect region information of an object in an image; an acquisition unit configured to detect a predetermined object region that is a part of the object from the region information of the object, and to acquire luminance information of a periphery of the predetermined object region; and a relighting unit configured to perform processing for correcting brightness of the object in the image by adding an effect of virtual light, wherein the relighting unit corrects the brightness of the object including the predetermined object region in accordance with luminance of the periphery of the predetermined object region.

In order to solve the aforementioned problems, the present invention provides an image capture apparatus comprising: an image capture unit configured to generate image data by capturing an object; and an image processing apparatus that comprises: a detection unit configured to detect region information of an object in an image; an acquisition unit configured to detect a predetermined object region that is a part of the object from the region information of the object, and to acquire luminance information of a periphery of the predetermined object region; and a relighting unit configured to perform processing for correcting brightness of the object in the image by adding an effect of virtual light, wherein the relighting unit corrects the brightness of the object including the predetermined object region in accordance with luminance of the periphery of the predetermined object region.

In order to solve the aforementioned problems, the present invention provides an image processing method comprising: detecting region information of an object in an image; detecting a predetermined object region that is a part of the object from the region information of the object, and acquiring luminance information of a periphery of the predetermined object region; and performing processing for correcting brightness of the object in the image by adding an effect of virtual light, wherein in performing the processing, the brightness of the object including the predetermined object region is corrected in accordance with luminance of the periphery of the predetermined object region.

In order to solve the aforementioned problems, the present invention provides a non-transitory computer-readable storage medium storing a program for causing a computer to execute an image processing method comprising: detecting region information of an object in an image; detecting a predetermined object region that is a part of the object from the region information of the object, and acquiring luminance information of a periphery of the predetermined object region; and performing processing for correcting brightness of the object in the image by adding an effect of virtual light, wherein in performing the processing, the brightness of the object including the predetermined object region is corrected in accordance with luminance of the periphery of the predetermined object region.

According to the present invention, the unnaturalness in an image after relighting processing can be reduced.

Further features of the present invention will become apparent from the following description of exemplary embodiments (with reference to the attached drawings).

BRIEF DESCRIPTION OF THE DRAWINGS

FIGS. 7A and 7B are diagrams showing examples of images before and after relighting processing according to the present embodiment.

FIG. 8 is a flowchart showing the relighting processing according to the present embodiment.

DESCRIPTION OF THE EMBODIMENTS

Figure 1:
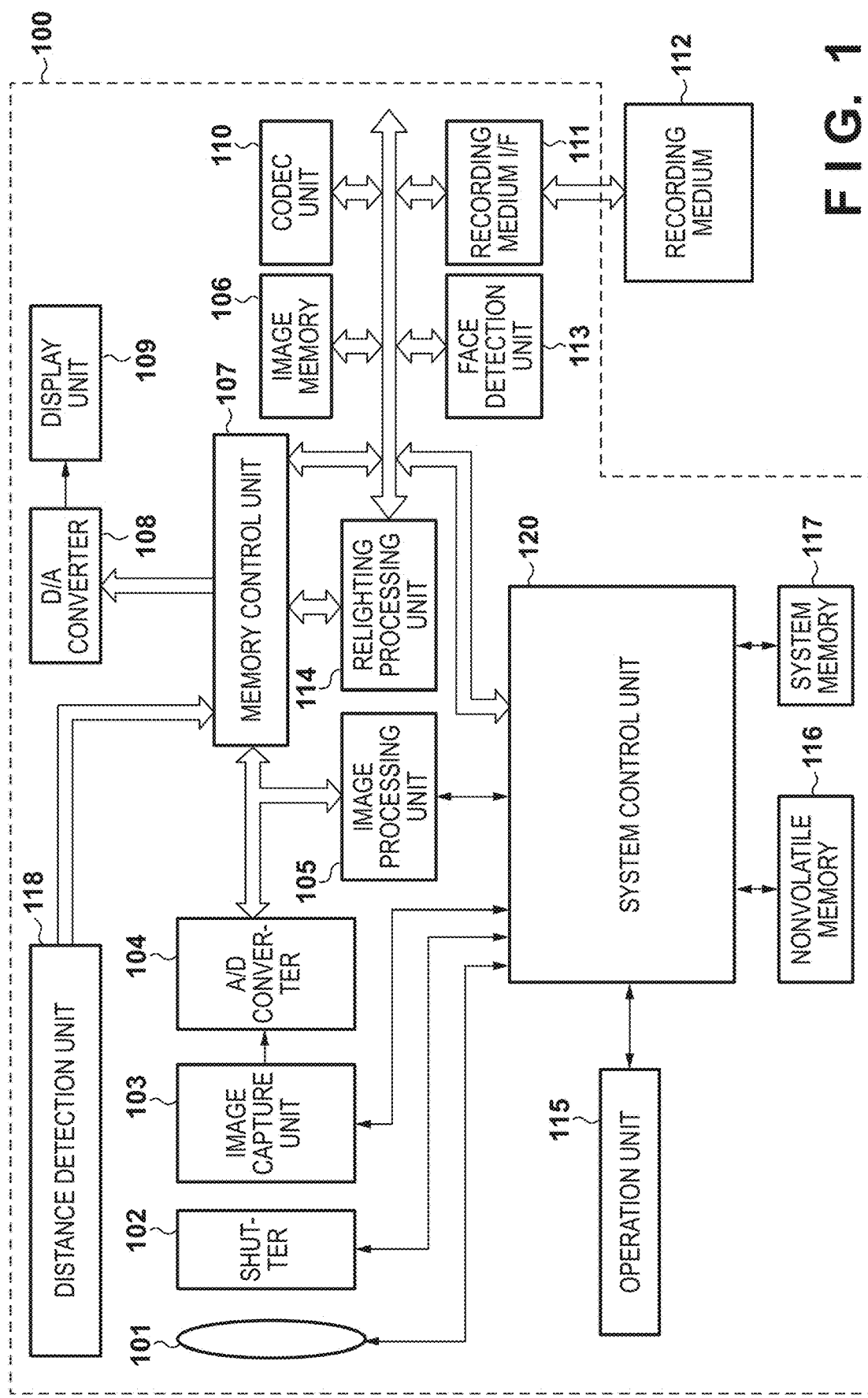
FIG. 1 is a block diagram showing an apparatus configuration according to the present embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

The following describes an example of application to an image capture apparatus, such as a digital camera, capable of capturing still images, moving images, and the like as an image processing apparatus according to the present embodiment. Note that while a digital camera is exemplarily described as an image capture apparatus 100 in the present embodiment, the image capture apparatus 100 may be an information processing apparatus such as a mobile telephone equipped with a camera, a smartphone which is one type of such a mobile telephone, a tablet terminal, or a personal computer (PC) equipped with a camera.

<Apparatus Configuration>

First, the configuration and functions of the image capture apparatus according to the present embodiment will be described with reference to FIG. 1.

The image capture apparatus 100 according to the present embodiment has a function of performing relighting (reillumination) processing for correcting (changing) shadows by irradiating an object in an image captured under a certain light source environment with virtual light from a virtual light source.

In FIG. 1, a lens 101 is a lens assembly including a zoom lens and a focus lens. A shutter 102 has a diaphragm function. An image capture unit 103 is an image sensor composed of, for example, a CCD or CMOS element that converts an optical image into electrical signals. An A/D converter 104 converts analog signals output from an image capture unit 103 into digital signals.

An image processing unit 105 performs various types of image processing including color conversion processing (e.g., white balance (WB) processing), gamma processing, edge enhancement processing, color correction processing, and the like with respect to image data that is output from the A/D converter 104 or image data that has been read out from an image memory 106 via a memory control unit 107.

The memory control unit 107 controls the image memory 106. The image memory 106 stores image data output from the A/D converter 104 and image data to be displayed on a display unit 109. The image memory 106 has a storage capacity sufficient to store a predetermined number of still images, as well as moving images and audio of a predetermined duration. The image memory 106 also functions as a memory for image display (video memory).

A D/A converter 108 converts data for image display stored in the image memory 106 into analog signals, and supplies the analog signals to the display unit 109. The display unit 109 is a display device, such as an LCD and an organic EL.

A codec unit 110 generates a video file by compressing and encoding image data that has been written into the image memory 106 in a predetermined format, such as JPEG, MPEG, and H.264, at a predetermined bit rate, and records the video file into a recording medium 112. The codec unit 110 also decodes a video file recorded in the recording medium 112 in a predetermined format at a predetermined bit rate, and stores the decoded video file into the image memory 106.

A recording medium I/F 111 is an interface that controls access to the recording medium 112. The recording medium 112 is, for example, a built-in and/or removable memory card or HDD (hard disk drive) for recording captured image data.

A face detection unit 113 detects information of a region of a face and facial parts of a human as an object in a captured image (hereinafter, facial region information).

A relighting processing unit 114 performs relighting processing for correcting the brightness by exposing an object in a captured image with virtual light. The details of the relighting processing will be described later.

An operation unit 115 represents such operation members as various types of switches, buttons, and a touchscreen that accept various types of operations from a user, and includes a power switch, a shutter button, a recording start/end button, and the like. The operation unit 115 notifies a system control unit 120 of various types of operation states.

The system control unit 120 realizes processing of later-described flowcharts by executing a program stored in a nonvolatile memory 116. 117 is a system memory, and a RAM is used thereas. Constants and variables for the operations of the system control unit 120, the program that has been read out from the nonvolatile memory 116, and the like are deployed to the system memory 117. Furthermore, the system control unit 120 also performs display control by controlling the image memory 106, the D/A converter 108, the display unit 109, and the like.

A distance detection unit 118 measures distances to an object in a captured image, and a distance calculation unit 403, which will be described later using FIG. 4, calculates distance information corresponding to pixel units of image capture pixels as a two-dimensional distance map.

Next, image capture processing of the image capture apparatus 100 according to the present embodiment will be described.

The image capture unit 103 photoelectrically converts light incident via the lens 101 and the shutter 102, and outputs the result of photoelectric conversion as analog image signals to the A/D converter 104. The A/D converter 104 converts analog image signals output from the image capture unit 103 into digital signals, and outputs the digital signals to the image processing unit 105.

The image processing unit 105 performs color conversion processing, gamma processing, edge enhancement processing, and the like with respect to image data from the A/D converter 104 or image data from the memory control unit 107. Furthermore, the image processing unit 105 performs predetermined evaluation value calculation processing (not shown) using facial region information detected by the face detection unit 113 and captured image data, and the system control unit 120 performs exposure control and focus detection control based on the obtained evaluation values. In this way, AF (autofocus) processing, AE (automatic exposure) processing, AWB (auto white balance) processing, and the like based on a TTL (through-the-lens) method are performed.

Image data output from the image processing unit 105 is written into the image memory 106 via the memory control unit 107. The image memory 106 stores image data output from the image capture unit 103 and image data to be displayed on the display unit 109.

Furthermore, the D/A converter 108 converts image data for display stored in the image memory 106 into analog signals, and supplies the analog signals to the display unit 109. The display unit 109 causes a display device, such as an LCD, to perform display in accordance with the analog signals from the D/A converter 108.

The codec unit 110 compresses and encodes image data stored in the image memory 106 in a predetermined format. The system control unit 120 stores the encoded image data in an associated manner into the recording medium 112 via the recording medium I/F 111.

<Image Processing Unit>

Next, the configuration and functions of the image processing unit 105 according to the present embodiment will be described with reference to FIG. 2 and FIG. 3.

Figure 2:
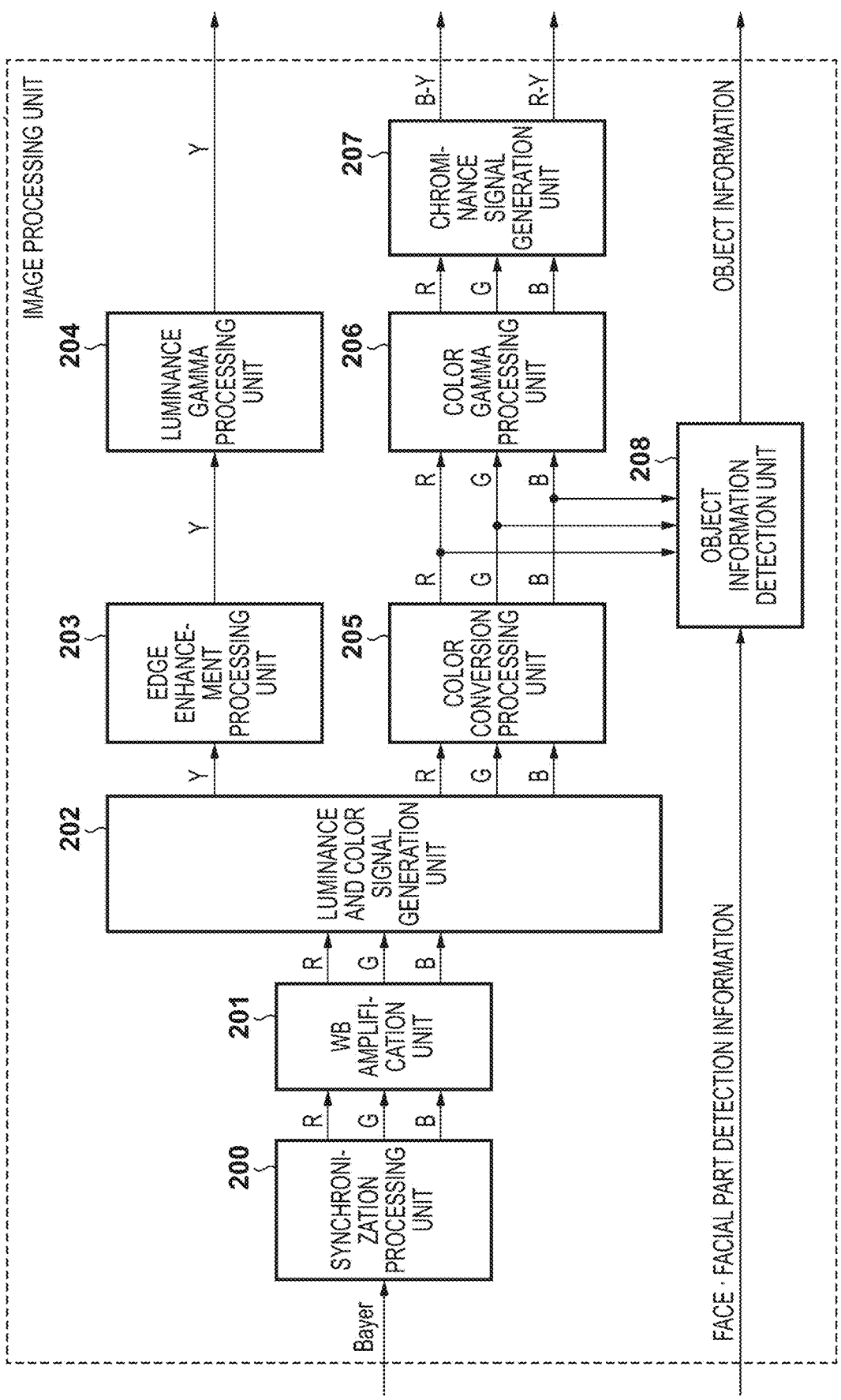
FIG. 2 is a block diagram showing a configuration of an image processing unit according to the present embodiment.
Figure 3:
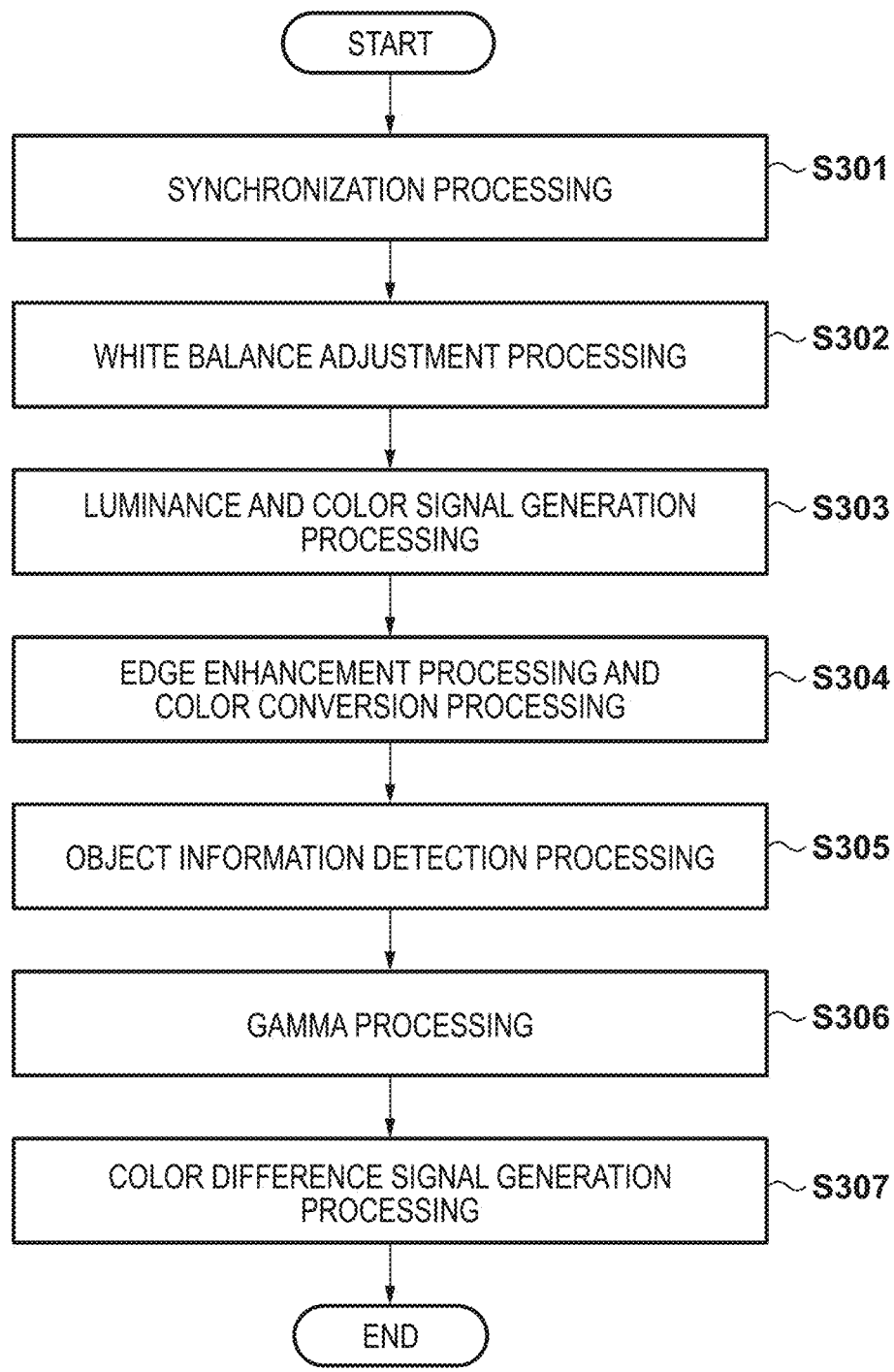
FIG. 3 is a flowchart showing processing of the image processing unit according to the present embodiment.

In FIG. 2, the image processing unit 105 includes a synchronization processing unit 200, a WB amplification unit 201, a luminance and color signal generation unit 202, an edge enhancement processing unit 203, a luminance gamma processing unit 204, a color conversion processing unit 205, a color gamma processing unit 206, a chrominance signal generation unit 207, and an object information detection unit 208. The system control unit 120 controls respective components of the image processing unit 105 by reading out the program stored in the nonvolatile memory 116 into the system memory 117 and executing the program.

Next, processing of the image processing unit 105 according to the present embodiment will be described with reference to a flowchart of FIG. 3.

Note that in the present embodiment, it is assumed that the image capture unit 103 is covered by a color filter with the Bayer arrangement, and each pixel of the image capture unit 103 outputs an image signal of R, G, or B.

In step S301, image signals input from the A/D converter 104 to the image processing unit 105 are input to the synchronization processing unit 200. The synchronization processing unit 200 performs synchronization processing with respect to the input image data of Bayer RGB, and generates color signals R, G, B.

In step S302, the WB amplification unit 201 adjusts the white balance by applying a gain to the RGB color signals based on a white balance gain value calculated by the system control unit 120.

In step S303, the RGB signals output from the WB amplification unit 201 are input to the luminance and color signal generation unit 202. The luminance and color signal generation unit 202 generates a luminance signal Y from the RGB signals, and outputs the generated luminance signal Y and the color signals RGB to the edge enhancement processing unit 203 and the color conversion processing unit 205, respectively.

In step S304, the edge enhancement processing unit 203 performs edge enhancement processing with respect to the luminance signal Y, and outputs the resultant luminance signal Y to the luminance gamma processing unit 204. The luminance gamma processing unit 204 performs gamma correction with respect to the luminance signal Y, and outputs the resultant luminance signal Y to the image memory 106. The color conversion processing unit 205 converts the color signals RGB into a desired color balance by performing matrix computation and the like with respect to the color signals RGB, and outputs the resultant color signals RGB to the color gamma processing unit 206 and the object information detection unit 208.

In step S305, the object information detection unit 208 detects object information in a captured image from facial region information output from the face detection unit 113 and the color signals RGB output from the color conversion processing unit 205. The object information includes the number, positions, and facial sizes of people who serve as objects in the captured image, contrast, shadow information, and the like. For example, information of the number, positions, and facial sizes of people who serve as objects is detected from pieces of coordinate position information of respective faces and parts that are output from the face detection unit 113, and the contrast and shadow information are detected from pieces of average luminance information and luminance histogram information of the entire captured image and respective objects.

In step S306, the luminance gamma processing unit 204 performs gamma correction with respect to the luminance signal Y, and outputs the gamma-corrected luminance signal Y to the image memory 106 via the memory control unit 107. The color gamma processing unit 206 performs gamma correction with respect to the color signals RGB, and outputs the resultant color signals RGB to the chrominance signal generation unit 207.

In step S307, the chrominance signal generation unit 207 generates chrominance signals R-Y, B-Y from the RGB signals, and outputs the chrominance signals R-Y, B-Y to the image memory 106 via the memory control unit 107. The luminance Y and the chrominance signals R-Y, B-Y stored in the image memory 106 are compressed and encoded by the codec unit 110 and recorded into the recording medium 112.

<Relighting Processing Unit>

Next, the configuration and functions of the relighting processing unit 114 according to the present embodiment will be described with reference to FIG. 4.

The relighting processing unit 114 receives, as inputs, the luminance signal Y and the chrominance signals B-Y, R-Y that have been processed by the image processing unit 105 and stored into the image memory 106, and performs relighting processing.

Figure 4:
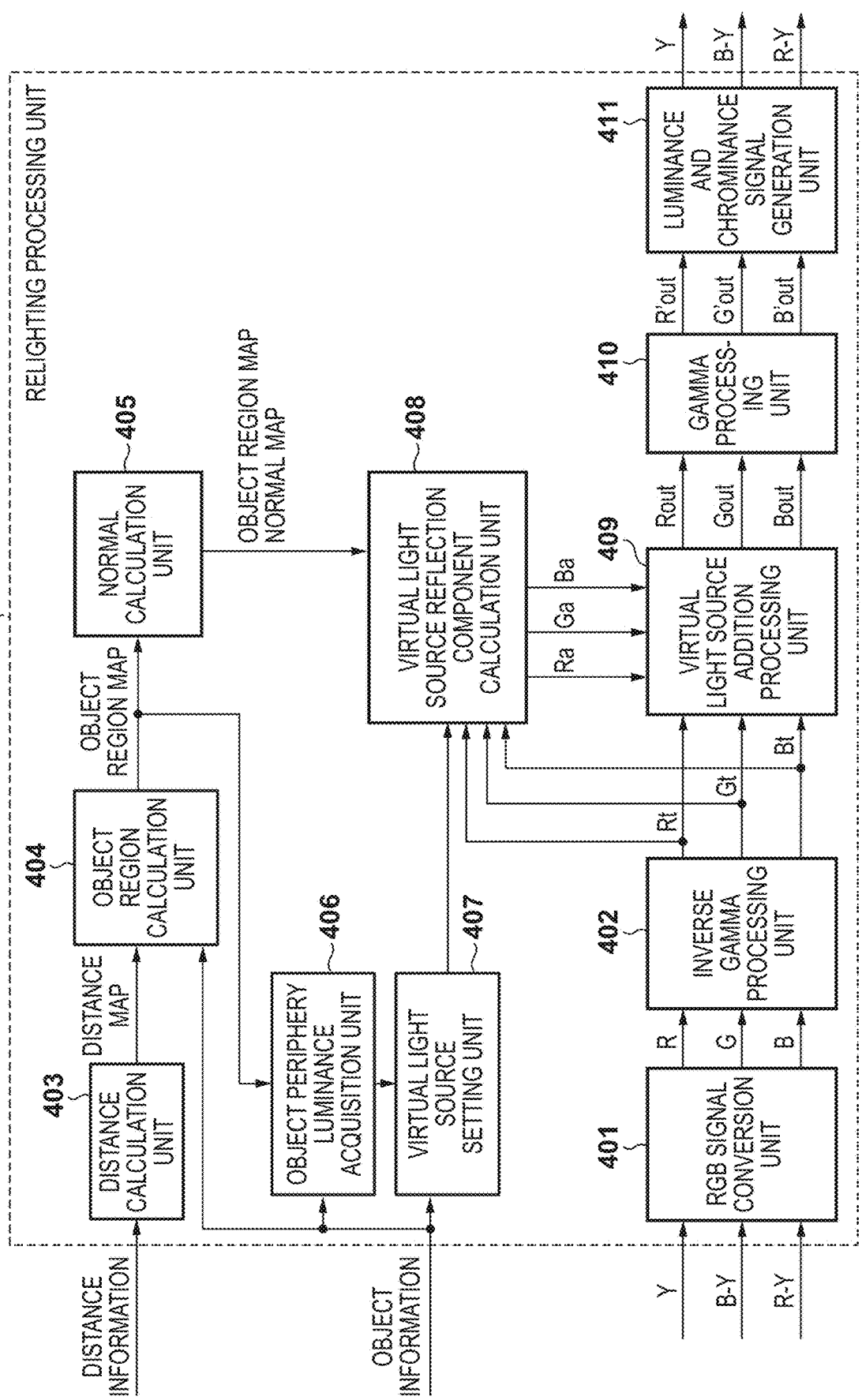
FIG. 4 is a block diagram showing a configuration of a relighting processing unit according to the present embodiment.

In FIG. 4, an RGB signal conversion unit 401 converts the input luminance signal Y and chrominance signals B-Y, R-Y into RGB signals, and outputs the RGB signals to an inverse gamma processing unit 402. The inverse gamma processing unit 402 performs computation (inverse gamma processing) with characteristics that are the inverse of the gamma characteristics of gamma correction performed in the luminance gamma processing unit 204 and the color gamma processing unit 206 of the image processing unit 105, thereby performing conversion into linear data. Then, the inverse gamma processing unit 402 outputs the RGB signals (Rt, Gt, Bt) converted into the linear data to a virtual light source reflection component calculation unit 408 and a virtual light source addition processing unit 409.

The distance calculation unit 403 calculates a distance map from distance information of an object acquired from the distance detection unit 118. The distance map is calculated based on two-dimensional object distance information that is obtained on a per-pixel basis for a captured image.

An object region calculation unit 404 calculates an object region map from object information input from the object information detection unit 208 and the distance map input from the distance calculation unit 403. The object region map is a map in which distances to an object are indicated in a simplified manner, and a region that is in a predetermined distance range relative to distance values of a main object is regarded as an object region in which pixel values are represented by predetermined fixed values. On the other hand, a region other than the object is regarded as a background region in which pixel values are treated as infinity. A normal calculation unit 405 receives, as an input, the object region map calculated in the object region calculation unit 404, and calculates a normal map as shape information indicating the shape of the object. It is assumed that the normal map is generated using a known method.

The normal calculation unit 405 outputs information of normals N corresponding to respective pixels in the captured image as the normal map to the virtual light source reflection component calculation unit 408.

An object periphery luminance acquisition unit 406 acquires luminance information of a region peripheral to the object using the object information in the captured image, which is input from the object information detection unit 208, or the object region map calculated by the object region calculation unit 404.

Note that although the distance calculation unit 403, object region calculation unit 404, normal calculation unit 405, and object periphery luminance acquisition unit 406 have been described as constituents inside the relighting processing unit 114, no limitation is intended by this. For example, they may be constituents inside the distance detection unit 118 or the image processing unit 105, or may be independent constituents.

A virtual light source setting unit 407 sets parameters for a virtual light source using the object information input from the object information detection unit 208 of the image processing unit 105 and the luminance information of the periphery of the object, which has been acquired by the object periphery luminance acquisition unit 406. For example, when a luminance value of the entire face of the object has been determined to be low from the object information, such parameters as the position, irradiation range, and intensity of the virtual light source are controlled so that the entire face is included in the irradiation range of the virtual light source in order to brighten the face as a whole. Furthermore, when a luminance value of the periphery of the object has been determined to be included in a predetermined luminance range from the luminance information of the periphery of the object, even if the object region map calculated by the object region calculation unit 404 extends outside of the actual object region, such parameters as the position of the virtual light source and the irradiation range and intensity of the virtual light are controlled so as to make such extension unnoticeable. The details of the method of controlling parameters for the virtual light source will be described later.

Figure 6A:
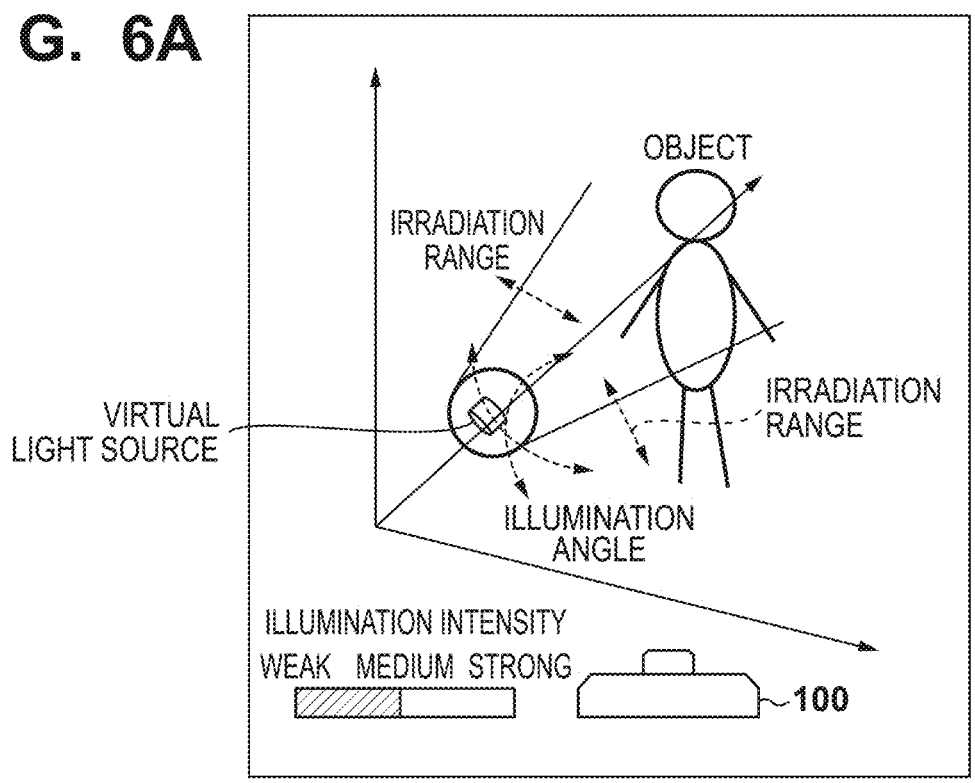
FIGS. 6A and 6B are diagrams for describing parameters for the virtual light source according to the present embodiment.
Figure 6B:
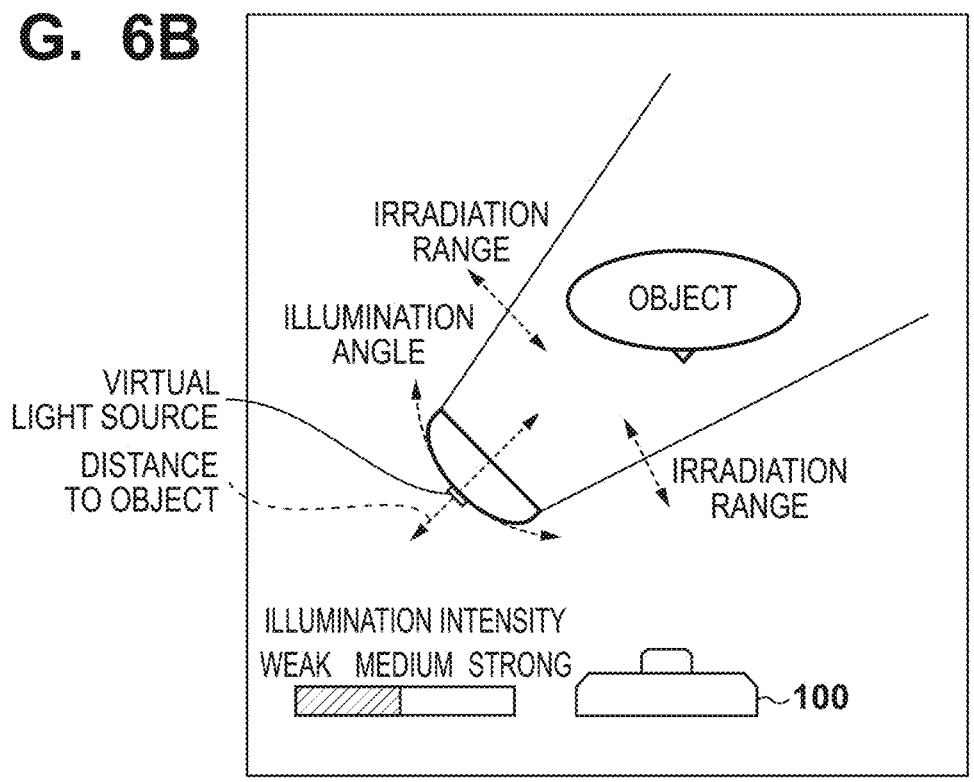

A description is now given of parameters that are used to set the virtual light source, using an example case where an object is one person as shown in FIGS. 6A and 6B. FIG. 6A is a perspective view showing a positional relationship between the object and the virtual light source. FIG. 6B is a plan view showing a positional relationship between the object and the virtual light source.

Regarding the position of the virtual light source, the object is exposed to the virtual light more intensely as the distance from the virtual light source to the object is reduced; conversely, the object is exposed to the virtual light more weakly as the distance to the object is increased. Regarding the irradiation range of the virtual light, the entire object can be exposed to light by increasing the irradiation range of the virtual light; conversely, only a part of the object can be exposed to light by reducing the irradiation range. Furthermore, regarding the intensity of the virtual light, the object is exposed to light more intensely as the intensity of the virtual light is increased; conversely, the object is exposed to light more weakly as the intensity is reduced.

The virtual light source reflection component calculation unit 408 calculates components of the virtual light that are reflected by the object based on distances K between the light source and the object according to the object region map, normal information N according to the normal map, and the parameters for the virtual light source set by the virtual light source setting unit 407. Specifically, the reflection components of the virtual light in an object portion corresponding to a coordinate position in the captured image are calculated so that they are inversely proportional to the square of a distance K between the virtual light source and the object portion corresponding to the relevant pixel, and proportional to the inner product of the vector of a normal N and the vector of a light source direction L.

Figure 5:
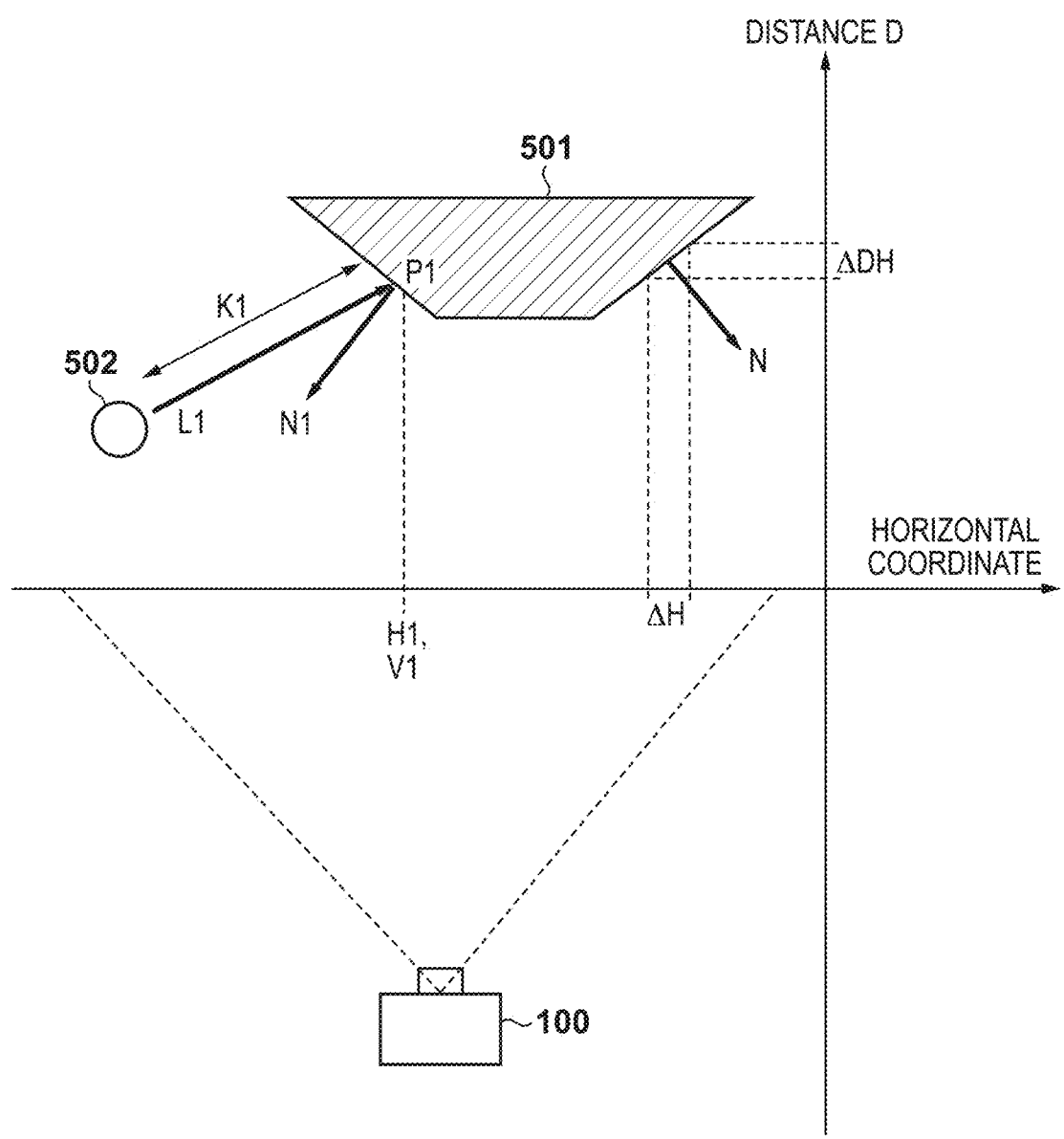
FIG. 5 is a schematic diagram for describing reflection of virtual light from a virtual light source according to the present embodiment.

A description is now given of the method of calculating the reflection components of the virtual light using FIG. 5. Note that although FIG. 5 only shows the horizontal direction of the captured image for the sake of simple explanation, the direction perpendicular to the paper surface is the vertical direction of the captured image as stated earlier. Below, a description is given of the method of calculating the reflection components of the virtual light at a point P1 on an object 501 corresponding to a horizontal pixel position H1 and a non-illustrated vertical pixel position V1 in the captured image.

In FIG. 5, a virtual light source 502 is a virtual light source that has been set for the object 501. The reflection components of the virtual light at the position (H1, V1) in the image captured by the image capture apparatus 100 have values that are proportional to the inner product of a normal vector N1 at the point P1 on the object 501 and a light source direction vector L1 of the virtual light source 502, and are inversely proportional to the square of a distance K1 between the virtual light source 502 and the point P1. Note that the normal vector N1 and the light source direction vector L1 are three-dimensional vectors composed of the horizontal direction, the vertical direction, and the depth direction (the direction indicated by the distance D in FIG. 5). When this relationship is expressed in a mathematical formula, the reflection components (Ra, Ga, Ba) of the virtual light at the point P1 on the object 501 are expressed by formula 1.

$$Ra = \alpha \times (-L1 \cdot N1)/K1^2 \times Rt$$

$$Ga = \alpha \times (-L1 \cdot N1)/K1^2 \times Gt$$

$$Ba = \alpha \times (-L1 \cdot N1)/K1^2 \times Bt \quad \text{(Formula 1)}$$

Here, α denotes the intensity of the virtual light and a gain value for a relighting correction amount, and Rt, Gt, Bt denote the RGB signals that are output from the inverse gamma processing unit 402.

The reflection components (Ra, Ga, Ba) of the virtual light that have been calculated using the aforementioned formula 1 are output to the virtual light source addition processing unit 409. The virtual light source addition processing unit 409 performs computation that uses formula 2, which is the addition of the reflection components (Ra, Ga, Ba) of the virtual light to the RGB signals output from the inverse gamma processing unit 402.

$$Rout = Rt + Ra$$

$$Gout = Gt + Ga$$

$$Bout = Bt + Ba \quad \text{(Formula 2)}$$

The RGB signals (Rout, Gout, Bout) that have undergone the relighting processing in the virtual light source addition processing unit 409 are input to a gamma processing unit 410 and undergo gamma processing. Then, a luminance and chrominance signal generation unit 411 generates a luminance signal Y and chrominance signals R-Y, B-Y from the RGB signals (R'out, G'out, B'out) that have undergone the gamma processing, and outputs the luminance signal Y and the chrominance signals R-Y, B-Y.

FIGS. 7A and 7B show examples of images before and after the relighting processing performed by the relighting processing unit 114; FIG. 7A shows an example of an image before the relighting processing, and FIG. 7B shows an example of an image after the relighting processing. The relighting processing is performed by having a dark object, which is shown in FIG. 7A, exposed to the virtual light; as a result, the brightness of the object is corrected as shown in FIG. 7B.

The system control unit 120 stores the luminance signal Y and the chrominance signals R-Y, B-Y output from the relighting processing unit 114 into the image memory 106 by controlling the memory control unit 107. Thereafter, compression and encoding are performed by controlling the codec unit 110, and the recording medium I/F 111 records the result of compression and encoding into the recording medium 112.

Next, the relighting processing performed by the relighting processing unit 114 according to the present embodiment will be described with reference to a flowchart of FIG. 8. Note that the processing of FIG. 8 is realized as the system control unit 120 reads out the program stored in the nonvolatile memory 116 into the system memory 117, executes the program, and controls respective components including the image processing unit 105 and the relighting processing unit 114. Furthermore, the processing of FIG. 8 is executed with respect to the image signals (the luminance signal Y and the chrominance signals R-Y, B-Y) that have been processed by the image processing unit 105 and stored into the image memory 106 when the relighting processing has been selected by a user operation via the operation unit 115.

In step S801, the object region calculation unit 404 acquires object information from the object information detection unit 208.

In step S802, the distance calculation unit 403 generates a distance map from distance information of an object acquired from the distance detection unit 118.

In step S803, the object region calculation unit 404 generates an object region map (map K) using distances K indicated by the distance map generated in step S802. In the object region map, distances to the object are indicated in a simplified manner, and a region that is in a predetermined distance range relative to distance values of a main object is regarded as an object region in which pixel values are represented by predetermined fixed values. On the other hand, a region other than the object is regarded as a background region in which pixel values are treated as infinity. Specifically, with use of the distance map generated in step S802, the object region map (map K) is obtained by using a region that is in a predetermined distance range based on distance values of a main object as an object region represented by predetermined fixed values.

In step S804, with use of the object region map acquired from the object region calculation unit 404, the normal calculation unit 405 generates a normal map (map N), which is shape information indicating the shape of the entire object including a predetermined object region, which is a partial region of the object. Note that the predetermined object region is a partial region included in the entire object; for example, in a case where the object is a person, the predetermined object region is equivalent to a facial region included in the entire object that includes a face and a body, or in a case where the object is a person who is wearing a hat or is on a ride, the predetermined object region is equivalent to a region of the face and the body included in the entire object that includes the hat and the ride.

Figure 9A:
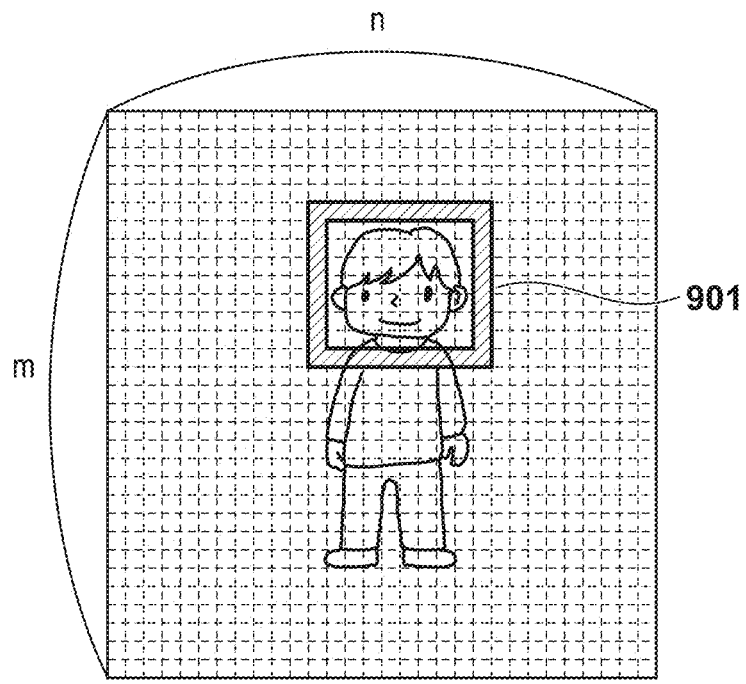
FIGS. 9A and 9B are diagrams for describing the method of acquiring the luminance of the periphery of an object according to the present embodiment.
Figure 9B:
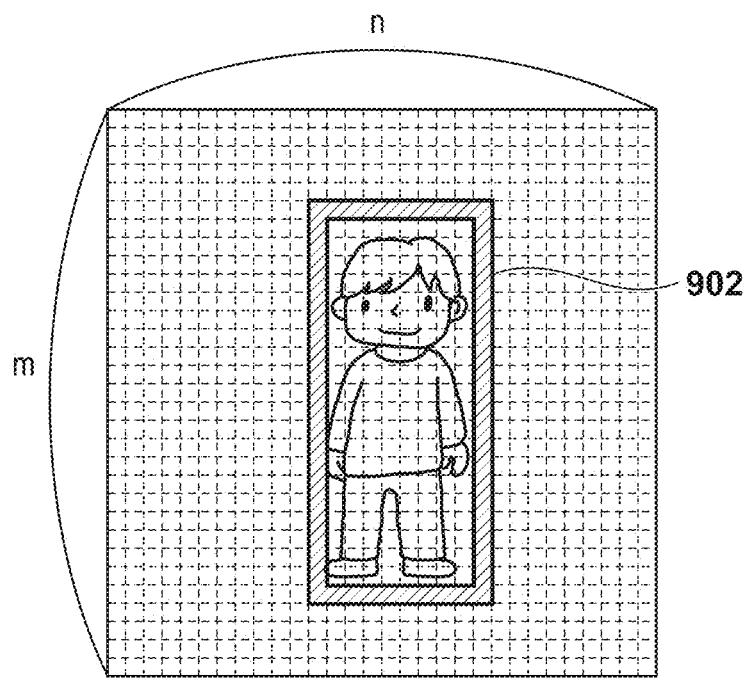

In step S805, the object periphery luminance acquisition unit 406 acquires luminance information of the periphery of the predetermined object region using the object information in a captured image, which is input from the object information detection unit 208, or the object region map calculated by the object region calculation unit 404. A description is now given of the method of acquiring the luminance information of the periphery of the predetermined object region using FIGS. 9A and 9B. As shown in FIGS. 9A and 9B, the luminance information of the periphery of the predetermined object region is acquired by dividing the entire captured image into a plurality of blocks, and by evaluating pieces of luminance information of respective blocks that correspond to the periphery of the predetermined object region. For example, when the luminance information of the periphery of the predetermined object region is acquired using the facial region information detected by the face detection unit 113, an average value of luminance values is calculated for each of blocks peripheral to the face, which are indicated by a diagonal line portion 901 in FIG. 9A. On the other hand, for example, when the luminance information of the periphery of the predetermined object region is acquired using the object region map calculated by the object region calculation unit 404, an average value of luminance values is calculated for each of blocks peripheral to the entire body including the periphery of the face, which are indicated by a diagonal line portion 902 in FIG. 9B.

In step S806, the virtual light source setting unit 407 generates a weight map associated with the virtual light source based on the luminance information acquired by the object periphery luminance acquisition unit 406 in step S805. For the weight map, the light source direction vectors −L of the virtual light source are calculated for respective pixels, and the direction cosines of respective vectors relative to the coordinate axis directions are obtained. Then, the weight map (map L) associated with the virtual light source is obtained by expressing the direction cosines in arbitrary bit widths for respective pixels.

Parameters indicating the position of the virtual light source and the intensity of the virtual light, which are for calculating the light source vectors −L of the virtual light source, are determined using the object information input that was acquired in step S801 and is input from the object information detection unit 208.

For example, when the luminance distribution inside the facial region of the object is uneven, the position of the virtual light source and the intensity of the virtual light are determined so that a region with a low luminance value is exposed to the virtual light.

For example, provided that the coordinates of a region with a low luminance value in the captured image are (x1, y1), reflection components (Ra (x1, y1), Ga (x1, y1), Ba (x1, y1)) of the virtual light attributed to the object are expressed by formula 3.

$$Ra(x1,y1)=\alpha \times (-L(x1,y1) \cdot N(x1,y1))/K(x1,y1)^2 \times Rt$$

$$Ga(x1,y1)=\alpha \times (-L(x1,y1) \cdot N(x1,y1))/K(x1,y1)^2 \times Gt$$

$$Ba(x1,y1)=\alpha \times (-L(x1,y1) \cdot N(x1,y1))/K(x1,y1)^2 \times Bt \quad \text{(Formula 3)}$$

Note that in formula 3, a denotes the intensity of the virtual light, and the intensity a of the virtual light is controlled based on the luminance information acquired by the object periphery luminance acquisition unit 406. The details of the method of controlling the intensity a of the virtual light will be described later. Also, L (x1, y1) denotes the light source direction vector of the virtual light source at a position on the object corresponding to the coordinates (x1, y1), and N (x1, y1) denotes the normal vector at a position on the object corresponding to the coordinates (x1, y1) in the normal map. Furthermore, K (x1, y1) denotes a distance between the virtual light source and a position on the object corresponding to the coordinates (x1, y1) in the object region map. In order to expose the object at the coordinates (x1, y1), which is a region with a low luminance value, to the virtual light, control is performed so that (Ra (x1, y1), Ga (x1, y1), Ba (x1, y1)) have positive values.

Figure 10A:
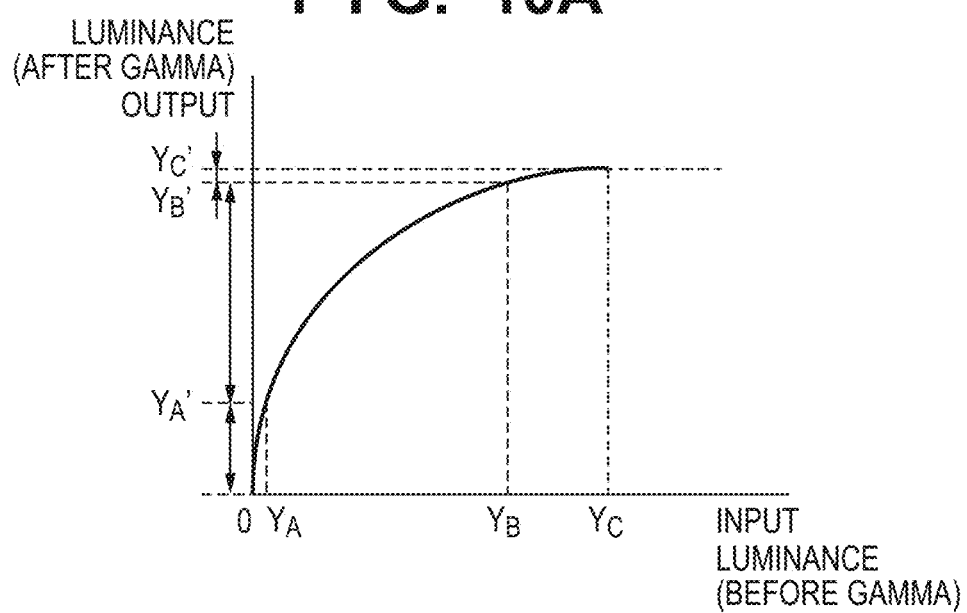
FIGS. 10A and 10B are diagrams for describing a relationship between the luminance of the periphery of the object and the light intensity of the virtual light source according to the present embodiment.
Figure 10B:
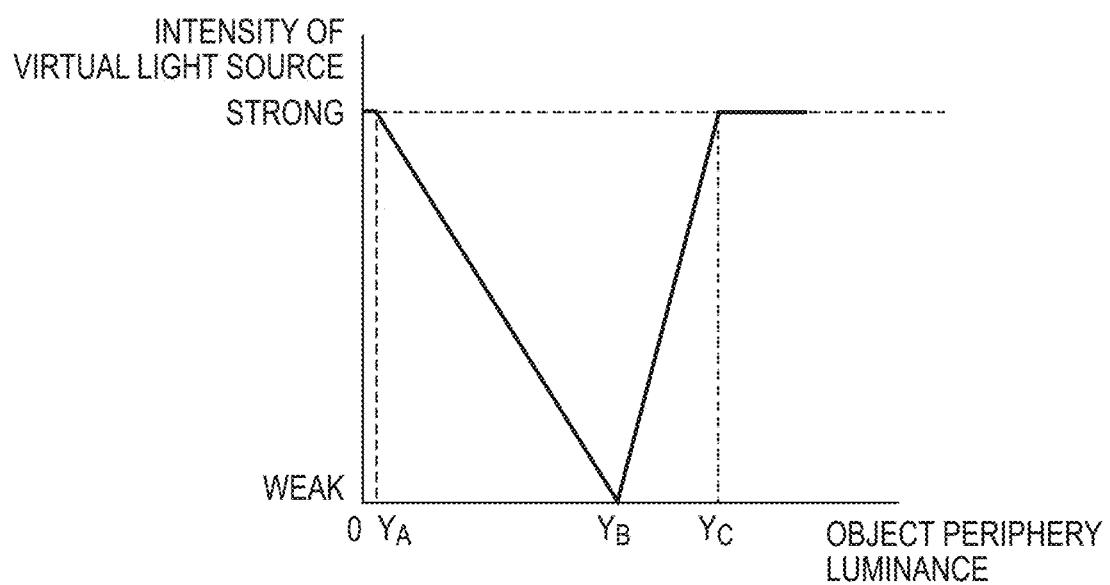

A description is now given of the method of controlling the intensity a of the virtual light based on the luminance information acquired by the object periphery luminance acquisition unit 406 with reference to FIGS. 10A and 10B.

FIG. 10A shows the gamma characteristics of the input and output of the luminance gamma processing unit 204 in the image processing unit 105. In a range with luminance values YA to YB, the gamma characteristics draw a curve, and a change in the output relative to the input is large. Conversely, in a range from YB to YC representing high luminance values, the gamma characteristics are becoming saturated, and a change in the output relative to the input is small. The inverse gamma processing unit 402 performs calculation (inverse gamma processing) with characteristics that are the inverse of the gamma characteristics of gamma correction performed in the luminance gamma processing unit 204; thus, for example, in the case of the gamma characteristics shown in FIG. 10A, the luminance gamma processing unit 204 converts YA, YB, and YC into YA', YB', and YC', respectively, and the inverse gamma processing unit 402 converts YA', YB', and YC' into YA, YB and YC, respectively.

As indicated by formula 1 and formula 2, the relighting processing is processing for adding the reflection components (Ra, Ga, Ba) of the virtual light attributed to the object to the RGB signals output from the inverse gamma processing unit 402. In relation to Rt, Gt, Bt representing the RGB signals output from the inverse gamma processing unit 402, the reflection components (Ra, Ga, Ba) of the virtual light attributed to the object are represented as being proportional to the inner product of a normal vector N1 and a light source direction vector L1 of the virtual light source, and as being inversely proportional to the square of a distance K1. Therefore, under the same light source direction vector L1 and distance K1, the reflection components (Ra, Ga, Ba) of the virtual light attributed to the object increase as Rt, Gt, Bt increase, that is to say, as the luminance value increases. Note that the gamma processing unit 410 performs gamma processing with characteristics that are similar to the luminance gamma processing unit 204 after the virtual light source addition processing unit 409 added the reflection components (Ra, Ga, Ba) to the RGB signals output from the inverse gamma processing unit 402; thus, when the reflection components (Ra, Ga, Ba) are too large, the difference between before and after the relighting processing is not large because the gamma characteristics in the gamma processing unit 410 are saturated. Therefore, when the luminance value is within the range of YA to YB in which the difference between before and after the relighting processing is large (the range in which the curve of the gamma characteristics is steep and the luminance is not too low and not too high), the object periphery luminance acquisition unit 406 performs control so that the larger the luminance value of the periphery of the object within the range of YA to YB, the smaller the intensity a of the virtual light as shown in FIG. 10B. Also, when the luminance value is in the range of 0 to YA, the luminance value is low and the difference between before and after the relighting processing is not large, and thus control is performed so as to increase the intensity a of the virtual light. Furthermore, when the luminance value is in the range of YB to YC in which the gamma characteristics are becoming saturated, the difference between before and after the relighting processing is not large, and thus control is performed so that the intensity a of the virtual light increases as the luminance value increases.

Figure 11A:
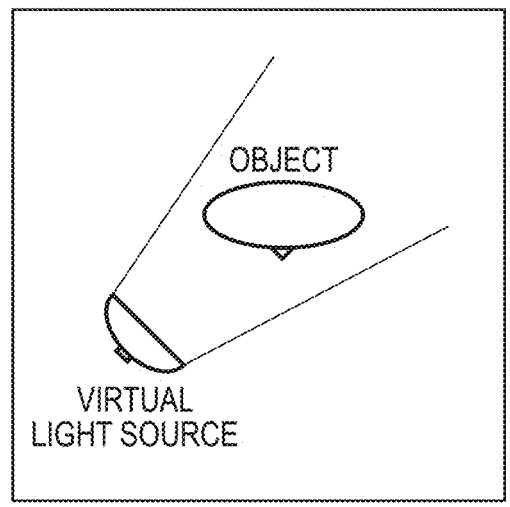
FIGS. 11A to 11C are diagrams for describing parameters for the virtual light source according to the present embodiment.
Figure 11B:
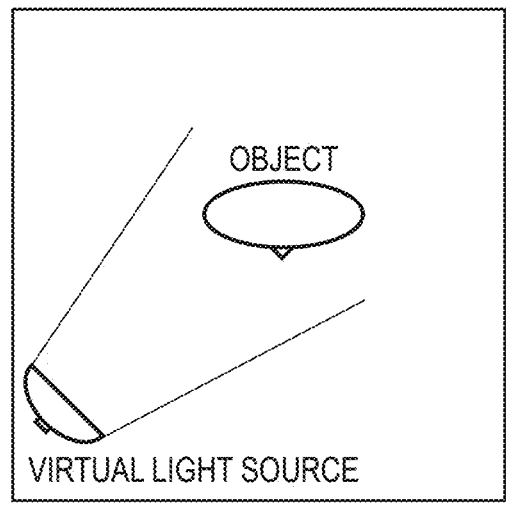
Figure 11C:
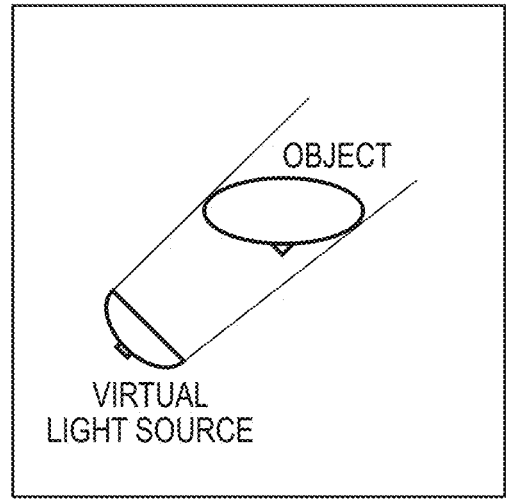

Also, a parameter indicating the distance K (x1, y1) between the virtual light source and the object may be controlled as shown in FIGS. 11A to 11C. FIGS. 11A to 11C are plan views showing a positional relationship between the object and the virtual light source. For example, the distance from the object to the virtual light source may be set to increase by moving the position of the virtual light source in FIG. 11A to the position of the virtual light source in FIG. 11B as the luminance values of the periphery of the object acquired in step S809 increase within the range of YA to YB.

In addition, a parameter indicating the irradiation range of the virtual light source may also be controlled. The parameter indicating the irradiation range is determined using luminance distribution information within the facial region of the object information acquired by the object information detection unit 208 and the luminance information of the periphery of the object acquired by the object periphery luminance acquisition unit 406. For example, control is performed so that the larger the luminance values of the periphery of the object acquired by the object periphery luminance acquisition unit 406 within the range of YA to YB, the less the periphery of the object is exposed to the virtual light source. That is to say, control is performed to reduce the illumination range of the virtual light source in FIG. 11A to the illumination range of the virtual light source in FIG. 11C so that only the object is exposed to the virtual light source.

Through the foregoing processing, the virtual light source setting unit 407 calculates the position of the virtual light source and the intensity and the irradiation range of the virtual light.

Returning to the description of FIG. 8, in step S807, the virtual light source reflection component calculation unit 408 calculates the reflection components (Ra, Ga, Ba) of the virtual light for the detected region of the object. Note that the reflection components (Ra, Ga, Ba) can be calculated using formula 1 as stated earlier. The reflection components (Ra, Ga, Ba) of the virtual light are calculated by performing the computation of formula 1 on a per-pixel basis with use of the object region map (map K) indicating the distances generated in step S803, the weight map (map N) of step S804 associated with normals to the object, and the weight map (map L) of step S806 associated with the virtual light source.

In step S808, the relighting processing is performed. As indicated by the aforementioned formula 2, the virtual light source addition processing unit 409 adds the reflection components (Ra, Ga, Ba) of the virtual light calculated in step S806 to the outputs (Rt, Gt, Bt) of the inverse gamma processing unit 402. Once the relighting processing has been completed, the processing of the relighting processing unit 114 is finished.

As described above, the relighting processing unit 114 performs the relighting processing with respect to an object in a captured image. Even when the accuracy of distance information is low, the unnaturalness of the result of the relighting processing that has been performed with respect to an object region can be reduced by controlling parameters for the virtual light source in accordance with the luminance of the periphery of the object.

Furthermore, although the present embodiment has been described using a digital camera as an example of the image capture apparatus, in the case of application to an information processing apparatus, such as a personal computer, it is permissible to adopt a configuration in which an image captured by a camera and the like is acquired and the relighting processing is performed with respect to the acquired image using parameters that have been arbitrarily set by a user for the virtual light source. If there are pieces of additional information, such as the result of facial detection, distance information, object region information, normal information, and object periphery luminance information, the relighting processing may be performed using these pieces of information together with the image.

Furthermore, although the present embodiment has been described using an example in which distance information is acquired using the distance detection unit 118, no limitation is intended by this. It is permissible to adopt a configuration in which distance information is acquired based on a phase difference between a plurality of object images generated by light beams that arrive from different regions of the pupil of an image capture optical system.

Furthermore, although the present embodiment has been described using a case where there is one virtual light source, no limitation is intended by this. It is permissible to adopt a configuration in which the relighting processing is performed using a plurality of virtual light sources; for example, one virtual light source may be located in the obliquely upper left of an object, and another virtual light source may be located in the obliquely upper right of the object.

Furthermore, although the present embodiment has been described using a case where correction is performed to increase the brightness using additive light, relighting processing for reducing the brightness may be performed. In this case, a negative gain value is used for the intensity a of the virtual light of the virtual light source (subtractive light). It is also permissible to adopt a configuration in which specular reflection light is added to an object. In this way, one of a plurality of types may be selected and used as the virtual light.

Furthermore, the method of calculating a distance D between the position of the virtual light source and a target pixel is not limited to the present embodiment, and any calculation method may be used. For example, a three-dimensional distance may be calculated by acquiring the position of the camera and the position of an object as three-dimensional positions.

Furthermore, although a formula that is inversely proportional to the square of a distance is used in the calculation in adding the reflection components of the virtual light, the calculation formula for the amount of added reflection components of the virtual light is not limited to this. For example, a formula that is inversely proportional to a distance D or a formula with which the irradiation range changes in the form of the Gaussian distribution may be used.

Furthermore, although the present embodiment has been described using a case where a face and parts are detected as an object, no limitation is intended by this, and an object other than a person may be detected. Also, a plurality of object detection methods may be used. For example, with use of methods based on pattern recognition and machine learning, it is permissible to use head detection that detects a region in which a human head exists from a captured image, pet detection that detects such pets as cats and dogs from a captured image, and so forth.

Furthermore, although the present embodiment has been described using a case where a person is detected as an object, no limitation is intended by this, and an object other than a person (e.g., a car, an animal, a plant, and the like) may be detected.

Other Embodiment

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-219075, filed Dec. 3, 2019 which is hereby incorporated by reference herein in its entirety.

What is claimed is:

1. An image processing apparatus comprising:
   at least one of a processor and a circuit configured to function as:
   a detection unit configured to detect region information of an object in an image;
   an acquisition unit configured to detect a predetermined object region that is a part of the object from the region information of the object, and to acquire luminance information of a periphery of the predetermined object region; and
   a relighting unit configured to perform processing for correcting brightness of the object in the image by adding an effect of virtual light,
   wherein the relighting unit corrects the brightness of the object including the predetermined object region such that, when luminance of the periphery of the predetermined object region is included in a predetermined illuminance range, the higher the luminance of the periphery of the predetermined object region, the weaker the effect of the virtual light.

2. The apparatus according to claim 1, wherein the at least one of a processor and a circuit is further configured to function as a generation unit configured to generate distance information indicating a distance to the object,
   wherein the detection unit detects the region information of the object based on the distance information.

3. The apparatus according to claim 1, wherein the at least one of a processor and a circuit is further configured to function as a calculation unit configured to calculate shape information of the object from the region information of the object,
   wherein the acquisition unit acquires the luminance information of the periphery of the predetermined object region based on the region information of the object or on the shape information of the object.

4. The apparatus according to claim 1, wherein the relighting unit controls parameters for a virtual light source that irradiates the virtual light so that the higher the luminance of the periphery of the predetermined object region, the weaker the virtual light with which the object including the predetermined object region is irradiated.

5. The apparatus according to claim 4, wherein the parameters for the virtual light source include a position of the virtual light source and an irradiation range and an intensity of the virtual light.

6. The apparatus according to claim 4, wherein the parameters for the virtual light source include a parameter indicating one of a plurality of types of virtual light including additive light that brightens the object, subtractive light that darkens the object, and specular reflection light that adds specular reflection to the object.

7. The apparatus according to claim 1, wherein the relighting unit controls parameters for a virtual light source that irradiates the virtual light so that the higher the luminance of the periphery of the predetermined object region, the less the object is exposed to the virtual light.

8. An image capture apparatus comprising:
   an image capture unit configured to generate image data by capturing an object; and
   an image processing apparatus that comprises:
   at least one of a processor and a circuit configured to function as:
   a detection unit configured to detect region information of an object in an image;
   an acquisition unit configured to detect a predetermined object region that is a part of the object from the region information of the object, and to acquire luminance information of a periphery of the predetermined object region; and
   a relighting unit configured to perform processing for correcting brightness of the object in the image by adding an effect of virtual light,
   wherein the relighting unit corrects the brightness of the object including the predetermined object region such that, when luminance of the periphery of the predetermined object region is included in a predetermined illuminance range, the higher the luminance of the periphery of the predetermined object region, the weaker the effect of the virtual light.

9. An image processing method comprising:
   detecting region information of an object in an image;
   detecting a predetermined object region that is a part of the object from the region information of the object, and acquiring luminance information of a periphery of the predetermined object region; and
   performing processing for correcting brightness of the object in the image by adding an effect of virtual light,
   wherein in performing the processing, the brightness of the object including the predetermined object region is corrected such that, when luminance of the periphery of the predetermined object region is included in a predetermined illuminance range,
   the higher the luminance of the periphery of the predetermined object region, the weaker the effect of the virtual light.

10. A non-transitory computer-readable storage medium storing a program for causing a computer to execute an image processing method comprising:
    detecting region information of an object in an image;
    detecting a predetermined object region that is a part of the object from the region information of the object, and acquiring luminance information of a periphery of the predetermined object region; and
    performing processing for correcting brightness of the object in the image by adding an effect of virtual light,
    wherein in performing the processing, the brightness of the object including the predetermined object region is corrected such that, when luminance of the periphery of the predetermined object region is included in a predetermined illuminance range, the higher the luminance of the periphery of the predetermined object region, the weaker the effect of the virtual light.

* * * * *